April 13, 1965 W. N. POWELL ETAL 3,177,641
AGRICULTURAL MACHINERY, PARTICULARLY PICK-UP BALERS
Filed April 3, 1963 11 Sheets-Sheet 3
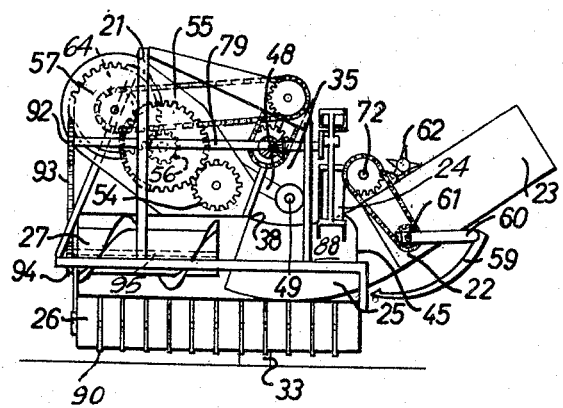
— FIG. 3. —
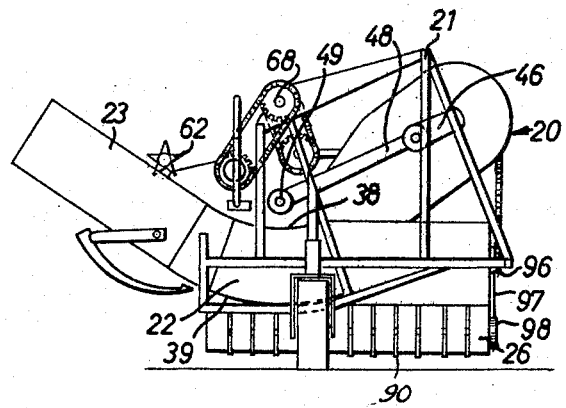
— FIG. 4. —
INVENTORS
WALTER NOEL POWELL, ALLAN FREDERICK POWELL, HENRY ANDERTON
BY
Mead, Browne, Schuyler + Beveridge,
Attorneys

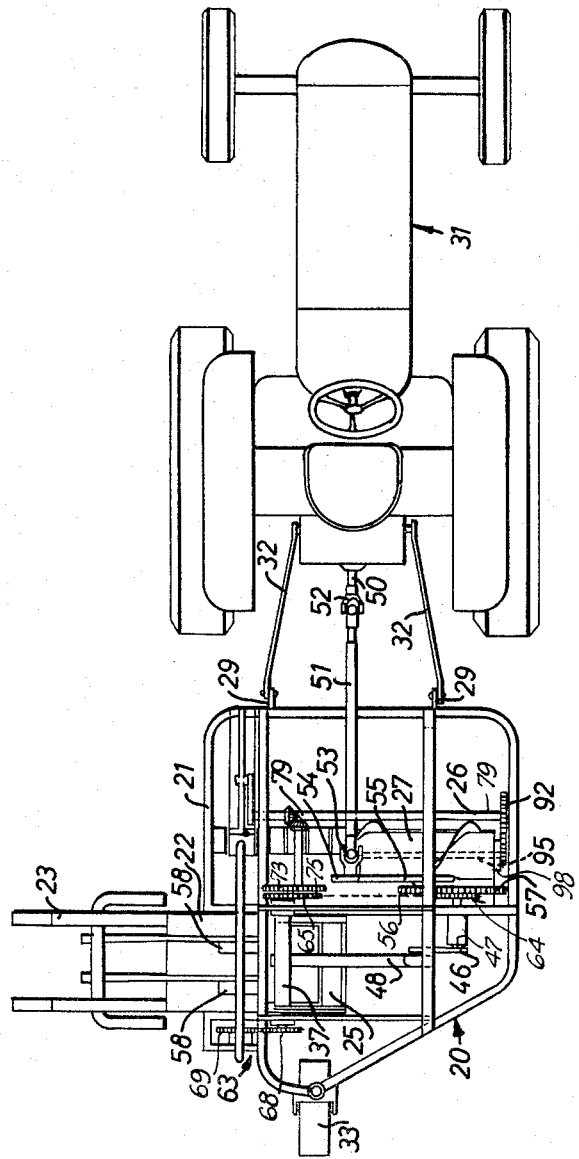

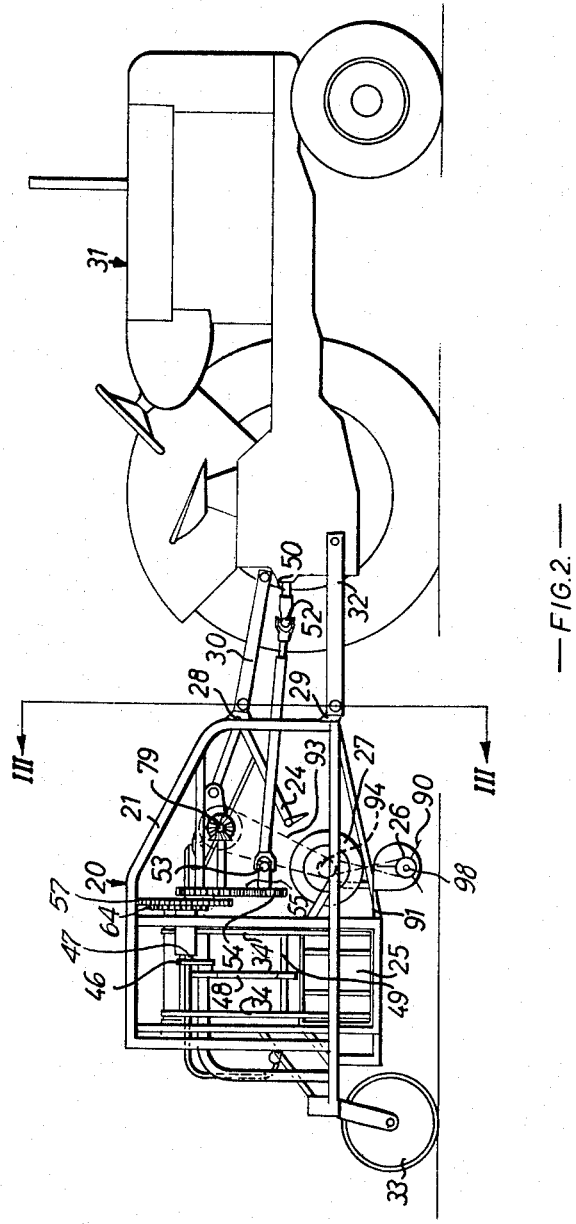

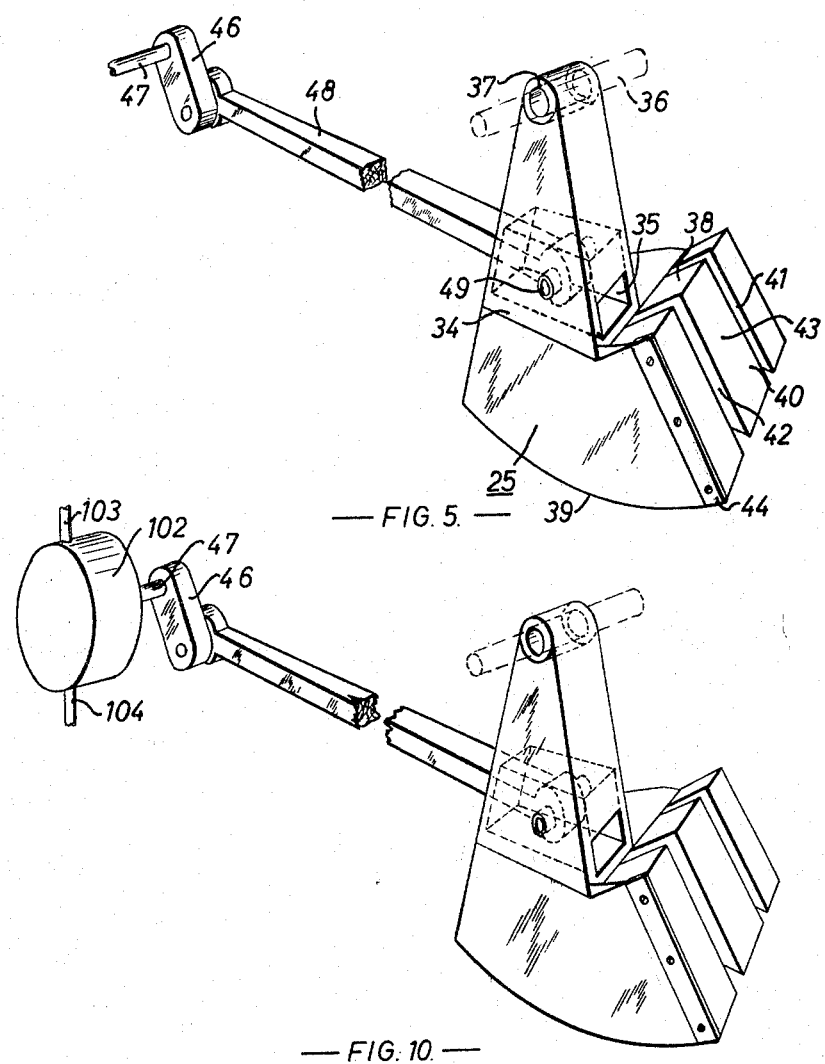

INVENTORS
WALTER NOEL POWELL, ALLAN FREDERICK POWELL, HENRY ANDERTON
BY
Mead, Browne, Schuyler + Beveridge,
Attorneys

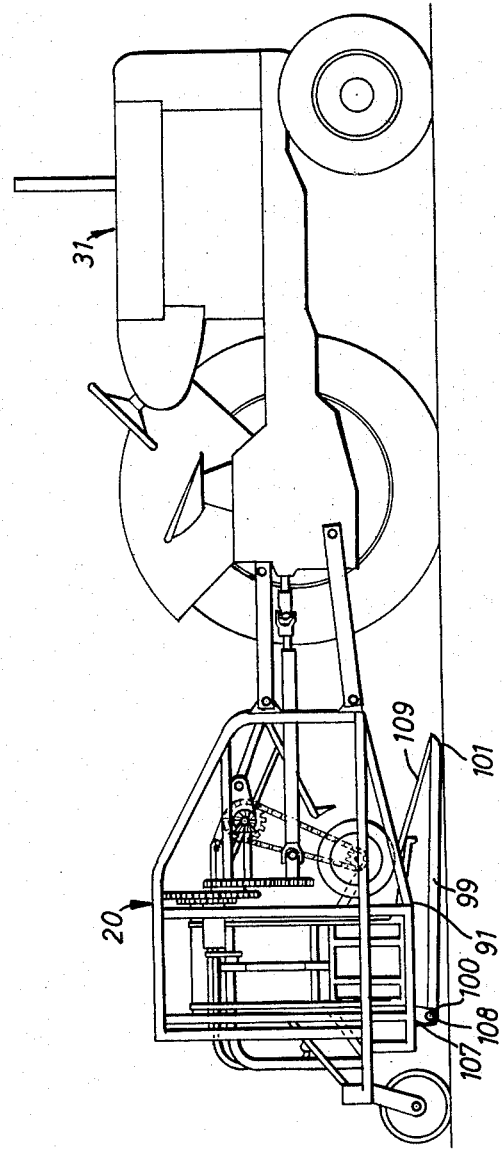

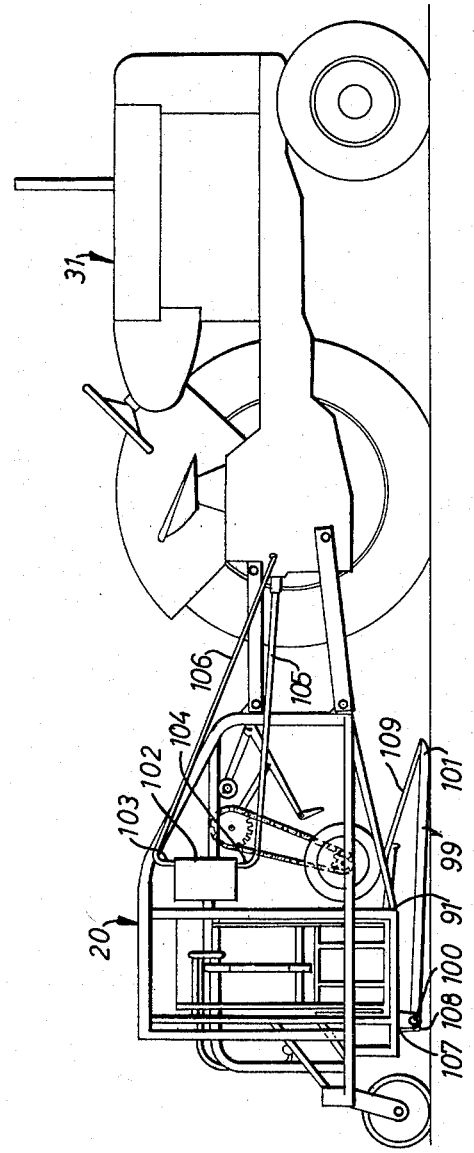

April 13, 1965   W. N. POWELL ETAL   3,177,641
AGRICULTURAL MACHINERY, PARTICULARLY PICK-UP BALERS
Filed April 3, 1963   11 Sheets-Sheet 8
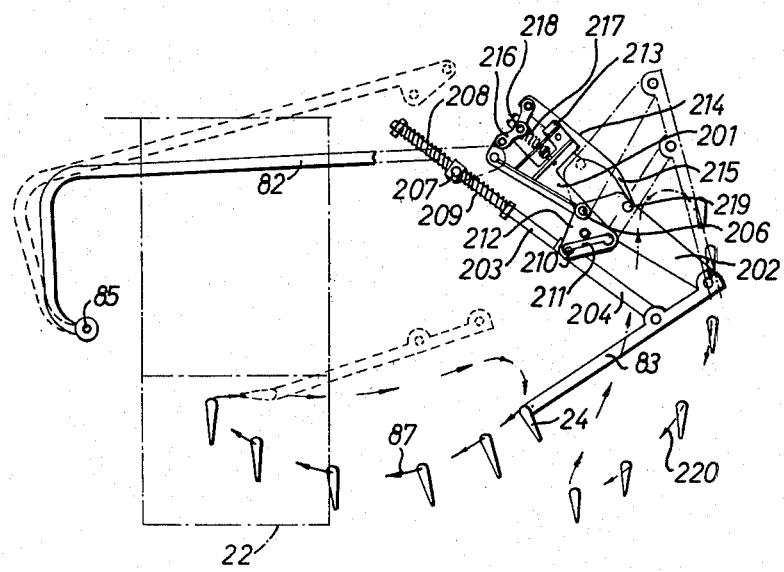
— FIG. 12. —
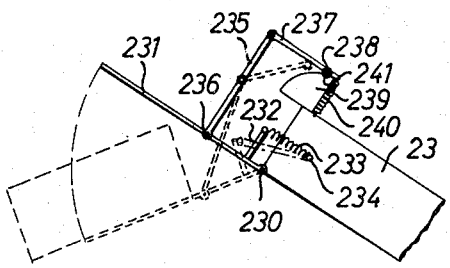
— FIG. 13. —
INVENTORS
WALTER NOEL POWELL, ALLAN FREDERICK POWELL, HENRY ANDERTON
BY
Mead, Browne, Schuyler + Beveridge,
Attorneys

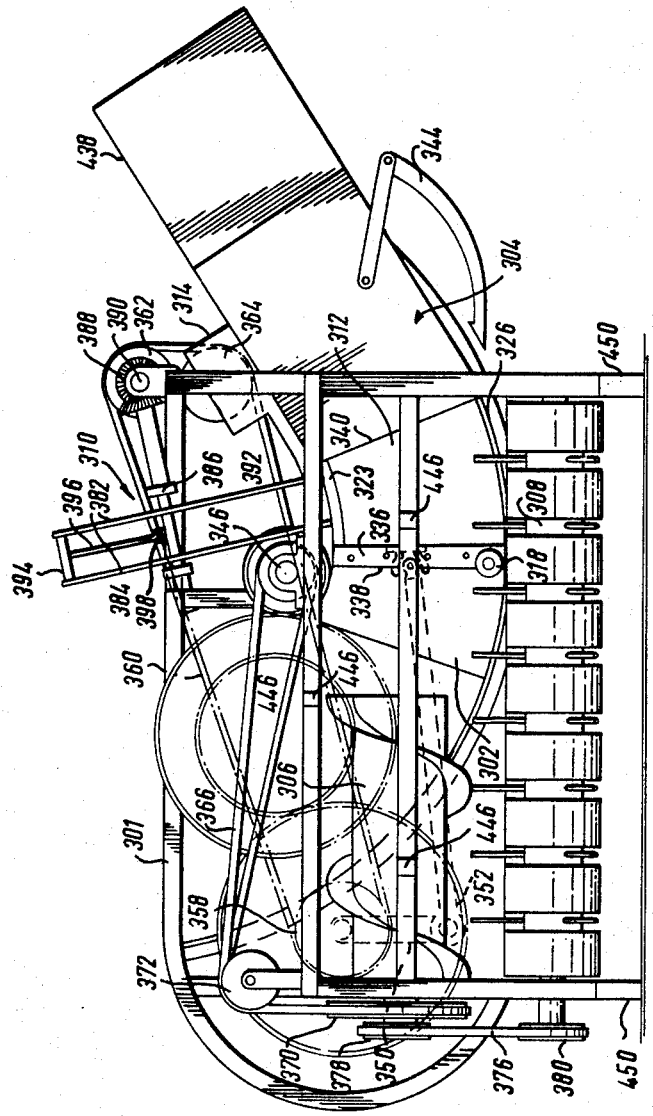

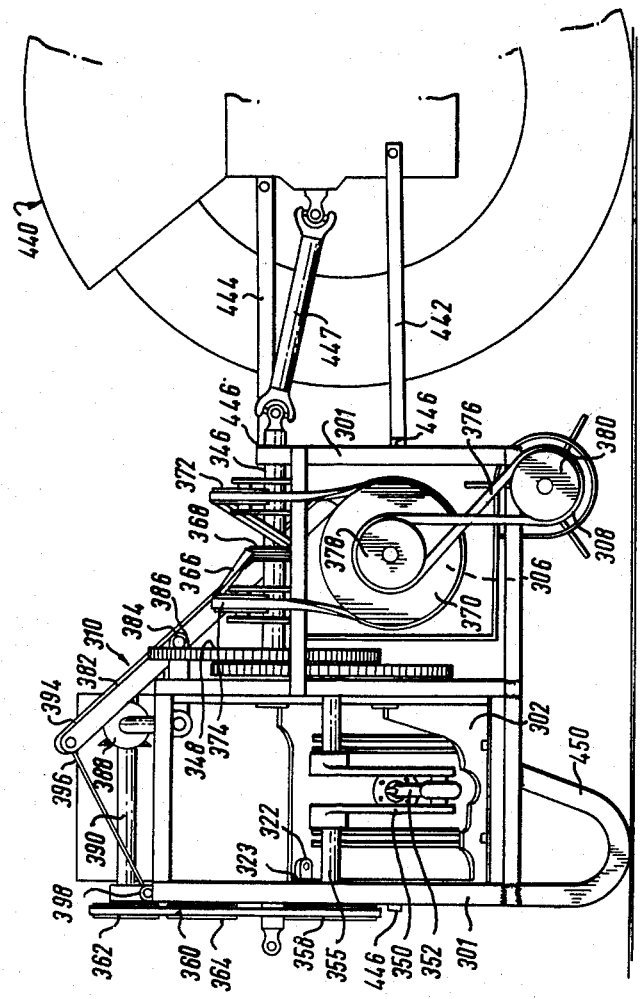

3,177,641
AGRICULTURAL MACHINERY, PARTICULARLY PICK-UP BALERS
Walter Noel Powell, 5 Church Lane, Eccleston, St. Helens, England; Allan Frederick Powell, 10 Oak Close, Whiston, near Prescot, England; and Henry Anderton, 24 N. Park Road, Kirkby, near Liverpool, England
Filed Apr. 3, 1963, Ser. No. 271,045
Claims priority, application Great Britain, Dec. 27, 1962, 48,615/62
25 Claims. (Cl. 56—341)

This application is a continuation-in-part of application Serial No. 79,042, filed December 28, 1960, now abandoned.

The present invention relates to baling machines and is especially concerned with the type known as pick-up balers.

In operation, when a pick-up baling machine is moved along, usually by a tractor, material to be baled, such as for example hay, is picked up by a pick-up reel and fed by a feeder into a baling chamber in which a ram is caused to reciprocate. In the baling chamber the material is compressed and caused to advance down the baling chamber under the action of the ram. During the formation of a bale in the baling chamber two or more lengths of binding twine pass around three sides of the bale and when the bale has reached a predetermined size the ends of each length of twine are brought together by a needle and tied in a knotter. Each needle brings a loop of twine across the baling chamber and this loop is severed by a cutter; the side of the loop which on severing becomes the free end of the twine is retained in a twine retainer when the needle is returned to the one side of the baling chamber and thus serves for the commencement of a length of twine around the next bale to be formed. As fresh material is received in the baling chamber and compressed by the ram, tied bales are subsequently discharged from an open end of the baling chamber.

The term "pick-up baler" as is used in this specification is to be understood as meaning a mobile implement adapted to be moved by a tractor over a field initially covered with material to be baled, for example, cut hay and straw, which implement will gather the material and form it into bales.

Previously such balers have been drawn by a tractor, being supported by two or more wheels in the manner of articulated trailers. This articulation involved difficulties and expense in a flexible driving shaft from the tractor to the baler and impaired the manoeuvrability of the tractor. These defects can be reduced according to the present invention by connecting a baler to a tractor body as a mounted or semi-mounted implement.

When the baler is connected as a mounted implement it is not necessary for the baler to have any road wheels since, as is customary with a mounted implement, the whole weight of the baler is taken by the tractor. If some measure of control of the height of the baler relative to the ground is desired, in addition to the customary control provided by the hydraulic arm of the tractor, or if some additional support for the baler is required to avoid the combination of baler and tractor becoming tail-heavy, the baler can be provided with one or more road wheels, preferably at or near the rear of the baler, and the baler connected as a semi-mounted implement.

Thus, a baler according to one feature of the present invention is, in effect, adapted to be attached to the tractor and not merely drawn as a trailer.

A baler is preferably pivotally connected to a pair of control arms of a tractor and also pivotally connected to a pair of lift arms of the tractor, so that, by operating the lift arms under hydraulic power available in the tractor in a well-known manner, the baler can be lifted completely clear of the ground or brought to any desired spacing from the ground for operational use. If a wheel is provided preferably at the rear of the baler, for engagement with the ground, it can serve to provide some measure of control of the spacing of the baler from the ground and can be adjustable in a well-known manner.

Preferably the baler includes a ram which is mounted to swing in the manner of a pendulum within a baling chamber which is correspondingly shaped, with an inlet opening in the region of the bottom of the swing of the pendulum. By imparting a swinging motion to the ram conveniently by a crank-and-connecting-rod mechanism, part of the kinetic energy acquired by the ram from one extremity of its swing to the bottom of its swing can be usefully employed in compressing material to be baled in the baling chamber, and it is found that in this way the energy demand by the ram for reciprocating it under given conditions can be more evenly distributed over a cycle of oscillation of the ram than is that normally demanded by a ram reciprocated along a linear path and it has been found that satisfactory driving conditions can be achieved without necessitating the incorporation of a fly-wheel in the drive to the ram as has hitherto been considered necessary with a linearly reciprocated ram.

Whereas hitherto, with a linearly reciprocated ram the stroke of the crank driving the ram has, of necessity, had to be equal to the desired stroke of the ram. With a swinging ram it is possible to use a crank of a throw less than the desired ram travel by connecting such crank to one end of a connecting rod, the other end of which is connected to one or more ram support arms at a location thereon intermediate the ram and the centre of swinging of the ram. A smaller throw of the crank enables a more compact structure of the baler to be obtained, thereby contributing to a reduction in weight.

Material to be baled can be collected by a pick-up at the forward end of the baler and delivered to the baling chamber by conveying means such as an auger in cooperation with a feed fork mechanism which cannot only serve to push material into the baling chamber, but may enter the baling chamber itself. To this end the feed forks preferably are pivotally mounted and are so adapted that when the feed forks are entering the baling chamber, they project downwards and propulsively engage material to be baled but, on withdrawal of the feed fork, can swing into a generally horizontal position and trail over the material to be baled, thereby having little tendency to withdraw material from the baling chamber.

The feed fork is preferably caused to travel in a quasi-elliptical path so that it enters the baling chamber at a lower level than that at which it is withdrawn therefrom.

The invention also envisages that the baler can be provided with a plurality of fingers for the purpose of gathering material from the ground, the forward end portions of which fingers ride along the ground, the front ends of the fingers being curved upwardly forwardly.

The baler also includes a pair of needles and a pair of knotters for tying baled material and drive means for operating the knotters and needles in co-operation with one another and with the swing of this ram. The ram, auger, feed fork, needles and knotters can be driven by the tractor, the drive being imparted to the baler by a cardan shaft extending between the power take-off of the tractor and a drive shaft of the baler. Alternatively the present invention, however, also envisages that one or more of the baler parts may be driven by hydraulic power drawn from the tractor; for example the ram may be swung by a hydraulic piston and cylinder mechanism. Whilst the feed fork and auger could also be driven by the same piston and cylinder mechanism, it is envisaged that a separate hydraulic piston and cylinder mechanism might be provided for their operation. Similarly a further hydraulic piston and cylinder mechanism could be provided for operating the needles and knotters. In a preferred arrangement, however, a hydraulic motor can be provided for driving not only the ram but also the feed fork and auger and the needles and knotters.

By providing hydraulic driving mechanism for all the major operating parts of the baler, it is possible to dispense with a mechanical drive from the power take-off of the tractor.

It is desirable that the bales be discharged from the baling chamber at such a height that they can drop into a farm trailer and so to avoid dropping the bale onto the ground and then having to lift it in order to load it onto a trailer. It is envisaged that the axis about which the ram is swung may be substantially parallel to the direction of travel of the baler when connected to and driven by a tractor, in which case bales of material can be discharged from the side of the baler and may conveniently be received in a vehicle travelling alongside.

The drive linkage to the feed fork mechanism may include an overload trip device in order to release the feed forks in the event of the path of the feed forks being obstructed or their passage into the baling chamber being unduly impeded.

A pivotally mounted spring loaded chute may be provided adjacent the discharge end of the baling chamber to allow baled material to expand into its tying strings and to guide it on discharge.

The invention will be more particularly described with reference to the accompanying drawings, in which:

FIG. 1 is a plan view of a baler according to the present invention, connected to a tractor, with certain parts removed for the sake of clarity;

FIG. 2 is a side elevation corresponding to FIG. 1;

FIG. 3 is a front elevation along the line III—III of FIG. 2;

FIG. 4 is a rear elevation corresponding to FIG. 3;

FIG. 5 is an enlarged detail view, partly in section, showing the drive to the ram;

FIG. 8 is a side elevation of a modified embodiment incorporating a sweep for picking up material to be baled;

FIG. 10 is an enlarged detail view corresponding to FIG. 5, of a modified drive to the ram;

FIG. 11 is a side elevation corresponding to FIG. 1 of a still further embodiment incorporating a sweep and a hydraulic motor.

FIG. 12 is a detail view of a modified feed fork mechanism embodying an overload trip, and FIG. 13 is a detail view in rear elevation of a bale discharge chute.

FIG. 14 is a front view of a further modified form of pick-up baler according to the invention;

FIG. 15 is a view of the off side of the baler shown in FIG. 14 and shows the baler attached to a tractor similar to that illustrated in FIGS. 1 and 2 but only part of which is shown;

Figure 6:
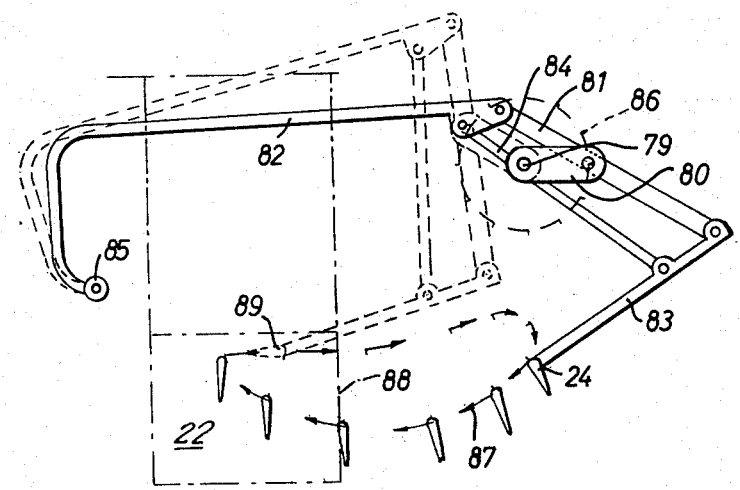
FIG. 6 is an enlarged detailed view of the drive to the feed fork illustrating the path followed by the fork.

Referring initially to FIGS. 1 to 7 of the drawings, a baling machine indicated generally at 20 comprises a framework 21, a baling chamber 22, a baling chamber extension 23, a feed fork 24, a ram 25 which is swingable reciprocably inside the baling chamber 22, a pick-up reel 26 and an auger 27. The frame work 21 is provided with an upper bracket 28 and a lower pair of brackets 29, as may be more clearly seen from FIG. 2. To the bracket 28 is pivotally connected a control arm or top link 30 for pivotal connection to the rear implement-receiving part of a tractor, indicated generally at 31. To the lower brackets 29 are pivotally connected a pair of hydraulic lift arms 32, connected to or forming part of a conventional hydraulic operating mechanism of the tractor 31. By means of the link 30 and lift arms 32, the baler 20 can be wholly mounted on the tractor 31 and can be regarded as a "mounted implement." If desired, a wheel 33 may be provided at the rear of the framework 21, and in operation such wheel can serve as a height control wheel and assist in regulating the height of the baler 20 above the ground. If such wheel 33 is provided, the baler can be regarded as a "semi-mounted implement." In every case feet (not shown) of a known construction are attached to the baler so that the baler can be stood clear of the ground when not in use.

As may be more clearly seen from FIG. 5 the ram 25 includes a sector-shaped arm-like member 34 conveniently formed of folded metal sheet with an inset open ended rectangular section box 35. The member 34 is pivotally carried on a shaft 36 and spaced apart by a tubular member 37. The outer end of the member 34 is connected to the ram 25 which has an upper surface 38 and a curved lower surface 39 and is substantially rectangular in cross-section. The leading face 40 is recessed at 41, 42. The front face 43 of the ram carries at its leading edge a cutter blade 44 which co-operates with a second cutter blade 45 disposed at the entrance to the baling chamber 22. The ram 25 is oscillated in the manner of a pendulum and is driven by a crank 46 disposed on a shaft 47 by means of a connecting rod 48 which is pivoted at one end to the crank 46, and at the other end to a gudgeon pin 49. By disposing the gudgeon pin 49 intermediate the shaft 36 and the upper surface 38 of the ram, the throw of the crank 46 can be smaller than the arcuate travel of the ram. By mounting the ram on the sector-shaped member 34, for pivotal movement about the shaft 36, it is possible to dispense with guide wheels for controlling the path of the ram.

The ram and other parts of the baler 20 can be driven from the power take-off 50 of the tractor 31, for which purpose a cardan shaft 51 is connected to the power take-off 50 through a universal joint 52 and through a second universal joint 53 is connected to a shaft on the baler 20 carrying a gear wheel 54. Gear wheel 54 meshes within an idler gear wheel 55 with which rotates a pinion 56 meshing with a gear wheel 57 on the shaft 47 as may be seen most clearly in FIGS. 2 and 3.

In baling machines constructed hitherto, it has been customary to include a fly-wheel in the drive transmission to the crank for reciprocating the ram, primarily with a view to reducing fluctuations in the energy demand from the prmie mover driving the baler. It has been found that by selecting the ratios of the transmission gear between the power take-off of the tractor and the shaft 47 such that for a given controlled speed of the power take-off of the tractor it is possible to swing the ram at a frequency at or near its natural frequency of operation, considerable conservation of energy can be achieved, since it is possible to use the energy in the swing of the ram to even out fluctuations of energy demanded, and it is possible to achieve satisfactory results without involving the use of a fly-wheel.

A plurality of knotter assemblies 58 of a known type for knotting lengths of twine around bales are disposed on the top of the baling chamber 22. These knotter assemblies 58 co-operate with needles 59, rigidly attached to arms 60, pivoted at 61, which arms are normally disposed below the baling chamber. The needles 59 are movable in vertical planes through the baling chamber 22 and the recesses 41, 42 on the ram face. Operation of the knotter assemblies and arms is initiated by a known measuring device, such as star wheel 62, which can indicate when the bale has reached the desired length, and is substantially co-ordinated with the inner dead central position of the ram swing, by an orthodox drive transmission indicated generally at 63, which is drivable from gear wheel 57 in the ram drive mechanism.

Figure 7:
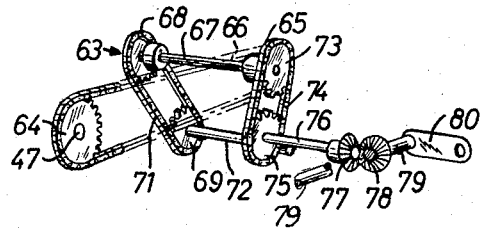
FIG. 7 is a diagrammatic perspective view of part of the driving transmission.

This knotter drive linkage 63, which is illustrated diagrammatically in FIG. 7, comprises chain wheels 64, 65, 68, 69 and chain drives 66, 71. Chain wheel 64, which is solidly connected to gear wheel 57 on shaft 47 and is shown in FIGS. 1 and 2, co-operates through chain drive 66 with chain wheel 65. Chain wheel 65 is solidly coupled by means of shaft 67 with chain wheel 68 and hence by chain drive 71 to chain wheel 69 which is mounted on the driving shaft 72 of the knotter assemblies 58. The knotter assemblies 58, the star wheel 62, and the needles 59 and their co-ordination together can be of any known type but is preferably that disclosed in U.S. Letters Patent No. 2,909,115.

The ram swing is also synchronised with the action of the feed forks 24, and for this the drive to the feed forks can be derived from chain wheel 73, which is solidly coupled with chain wheel 65, and the drive is transmitted via chain drive 74 to chain wheel 75, shaft 76, bevel gears 77, 78 to shaft 79. The movement of the feed forks 24 is constrained by linkages to follow the path indicated in FIG. 6. This linkage comprises a crank 80, keyed onto shaft 79, pivotally bearing at its outer end a double-ended connecting rod 81, which is pivotally connected at one end to pivoted link 82 and at the other end to feed fork member 83, which member pivotally bears the feed forks 24 at its other extremity. Also pivotally connected at one end to the pivoted link 82 and at the other end to the feed fork member 83 is a slave link 84. The pivoted link 82 is pivoted about a pivot 85, at a relatively large distance away from the shaft 79. Thus, as will be seen in FIG. 6, as shaft 79 and the crank 80 rotate and the point of pivoting of the connecting rod 81 thereto moves around a circle as indicated at 86, pivoted link 82 oscillates through a small angle constraining relative movement of the connecting rod 81 and slave link 84, with the result that the feed forks 24 at the end of the feed fork member 83 travel in the path indicated at 87.

These feed forks 24 are thus movable in a quasi-elliptical path and this path enters the baling chamber 22 through an aperture generally indicated at 88. In order to enable the feed forks to be withdrawn from the baling chamber without extracting material therefrom, they are pivotally mounted at the end of the feed fork member 83, and during withdrawal swing upwardly and trail behind the member 83 as indicated at 89.

Material picked up by rotating spring tines 90 of the pick-up reel 26 is concentrated in the path of the feed forks 24 by the auger 27 rotating in an auger chamber 91 in a well known manner. The drive for the auger is derived from shaft 79 on which is keyed chain-wheel 92. Chain-wheel 92 is linked by chain 93 to chain-wheel 94 on the auger shaft 95. Also on auger shaft 95 is keyed a pulley 96 which co-operates with belt 97 and pulley 98 to drive the pick-up reel 26.

Thus, in operation, the spring tines 90 of the pick-up reel 26 gather the material to be baled and transfer it to the auger chamber 91. The auger 27 transfers it into the path of the feed forks 24 which insert it into the baling chamber 22. The ram 25 swings down and compacts it against the resistance offered by material already in the baling chamber, the blades 44, 45 severing any loose ends to avoid jamming of the ram. When the star wheel 62 indicates a desired size of bale, the knotter assemblies 58 operate during continued swinging of the ram, and tie the bale whilst under compression by the ram 25. The baler continues to operate with a subsequent bale forcing the first bale out of the baling chamber extension 23 at a height in excess of that of the sides of a trailer suitable for carrying the bales from the field so that the bale may be discharged into the trailer.

An alternative form of the invention shown in FIG. 8 substitutes the use of fingers 99 instead of a pick-up reel. These fingers 99 are pivotally attached to shaft 100 and at their forward ends 101 their lower surfaces are curved upwardly forwardly. The fingers, under gravity, ride along the ground, though downward movement of the fingers is restricted by a stop bar 107 for engaging the rear ends 108 of the fingers behind the shaft 100. Affixed to the forward ends 101 of the fingers 99 and extending upwardly and rearwardly therefrom are elevating members 109 leading into the auger chamber 91.

Whereas in the embodiment illustrated in FIGS. 1 to 7 the drive to the ram is mechanical, the present invention envisages that the baler may be driven by a hydraulic motor 102, the pressure fluid for the hydraulic power being supplied from the tractor's hydraulic pump. One suitable arrangement for doing this is illustrated in FIGS. 9 and 10, which show that the drive to shaft 47 is replaced by a single hydraulic motor 102 with hydraulic couplings 103, 104, for connection to pressure fluid outlet and inlet couplings on the tractor.

Figure 9:
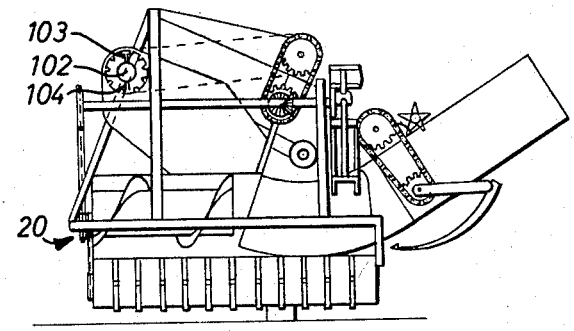
FIG. 9 is a view corresponding to FIG. 3 of a modified embodiment which incorporates a hydraulic motor.
Figure 16:
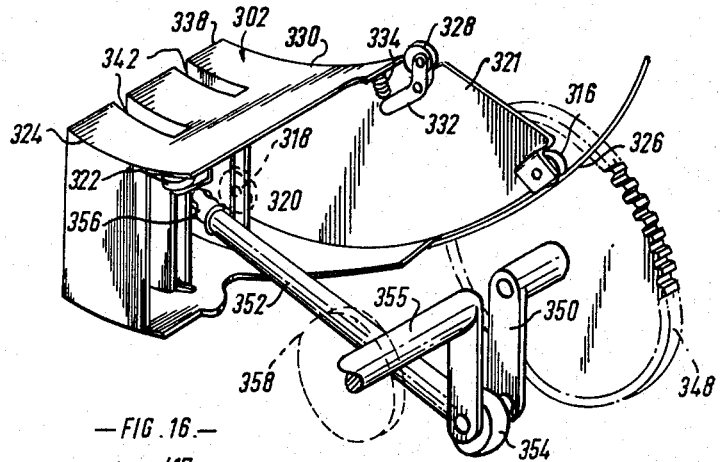
FIG. 16 is a detail of the ram of the baler shown in FIGS. 14 and 15.

The embodiment illustrated in FIG. 11 incorporates the arrangements illustrated in FIGS. 8, 9 and 10 and obviates the mechanical drive and Cardan shaft connecting to the tractor power take-off as is required in the embodiment of FIGS. 1 to 7. Instead, flexible hydraulic fluid supply and return tubes 105, 106 are necessary to enable the baler to be operated by hydraulic power derived from the tractor by the hydraulic motor 102 as hereinbefore described with reference to FIGS. 9 and 10. This embodiment also includes fingers 99 as hereinbefore described with reference to FIG. 8.

It will be obvious to one skilled in the art that the baler of the present invention may be adapted to discharge the bales behind the baler so that they may be loaded in a trailer towed behind the baler. The parts have to be so arranged that the feed forks 24 and the auger (which are now acting in the same direction, assisting each other in the transfer of the material) do not interfere one with the other. This is conveniently done by known linkages which constrain the feed fork into a boomerang shaped path.

A modified form of feed fork mechanism embodying an overload trip is illustrated in FIG. 12. The connecting rod 81 and the slave link 84 connecting the feed fork member 83 to the pivoted link 82 in the arrangement illustrated in FIG. 6 are replaced by two driving links 201, 202, and by two slave link parts 203, 204 respectively. Link 201 is pivotally connected at 205 to link 82 and by crank pin 206 to link 202 which is pivoted to member 83. The crank pin 206 extends from the crank 80 which is shown in FIG. 6 but not in FIG. 12. Slave link part 203 has slidably disposed thereon a collar 207 which is located between two compression springs 208, 209 and is pivoted to the link 82. The slave link part 204 is pivoted by pin 210 to the part 203 and is also pivoted to the member 83. Pin 210 is received in a slot 211 in a triangular member 212 pivoted to the crank pin 206. The link 201 has a bracket 213 to which is pivoted a lever 214 connected by a toggle linkage 216 to the link 201 and having a shaped arm 215. An adjustable compression spring 217 acts between the bracket 213 and the centre pivot 218 of the toggle linkage 216. The link 202 carries a pin 219 which engages the shaped arm 215.

When in normal operation the parts are generally in the relative disposition indicated and the feed forks 24 travel along the path indicated at 87. Depending upon the reaction encountered by the feed fork 24 when urging material into the baling chamber 22 the pin 219 will travel along a flattened end portion of the shaped arm 215 of lever 214, but if the reaction exceeds an amount determined by the setting of the spring 217 the pin 219 will engage a curved portion of the shaped arm 215 of the lever 214. Such curved portion has a radius greater than the radius of the pin 219 about the crank pin 206 and the link 202 will rotate anticlockwise relatively to the link 201 and the feed forks then travel along the path indicated at 220, clear of the auger and the baling chamber. When any obstruction has been cleared, the links can be reset manually.

For occasions when bales of material are discharged onto the ground it is convenient to provide a discharge chute at the discharge end of the baling chamber. Such a chute is illustrated diagrammatically in FIG. 13. Pivotally mounted at 230 at the end of baling chamber extension 23 is a chute plate 231 having an upstanding bracket 232 connected to one end of a spring 233, the other end of which is connected to an anchor 234 on the extension 23. A lever 235 is pivoted to the chute plate 231 at 236 and to a retaining lever 237 which carries a roller 238 riding on a quadrant plate 239 carried by the extension 23, the roller 238 being urged into engagement with the quadrant plate by a spring 240. The quadrant plate 239 is notched at 241 and when the chute plate is in the upper position the roller is held by the notch and the spring 240 and serves to retain the chute plate 231. As a bale of material emerges from the baling chamber it rides upwardly and outwardly along the chute plate 231 and the baled material can expand within the tying strings. When the weight of the bale acting on the chute plate is sufficient to overcome the pull of the spring 240 the roller 239 rolls out of the notch 241, the chute plate 231 rotates into a lower position and the bale slides down onto the ground 242. When the bale has slid off the chute plate 231 the spring 233 restores the plate 231 to its upper position.

The chute plate is not necessary when bales are being delivered onto a wagon or sledge.

It will be seen that each described with reference to FIGS. 1 to 13 of the elements of the baler is individually carried by the framework 21, which is of a skeleton structure, with the result that a compact and light machine can be construced which can be attached to a tractor by the conventional three point pitch and supported entirely by the tractor. In order to further reduce the weight of the machine the skeleton framework 21 may be conveniently made from tubular members.

The modified baler illustrated in FIGS. 14 to 19 also incorporates the feature that each of the elements thereof is carried by a skelton framework but in this embodiment the ram, instead of being mounted to swing as a pendulum, is mounted on rollers for reciprocation along an arcuate path which includes part of a partly arcuate baling chamber. The ram is preferably driven from a common input shaft, adapted for connection to the power take-off of a tractor, through reduction gears, a crank and a connecting rod which is preferably coupled to the crank by a self-aligning bearing and to the ram by a universal joint.

Thus according to another aspect of the present invention there is provided a baler in which a ram can be reciprocated by a crank and a connecting rod, which is coupled to the ram by a universal joint. The connecting rod is preferably coupled to the crank by a self-aligning bearing.

The feeder preferably comprises a feed fork, adjacent the baling chamber inlet, arranged to enter the baling chamber through the inlet and to leave the baling chamber through the top thereof. The feed fork is pivotally carried at a point intermediate its ends by a crank and has a lower end for engaging the material to be baled and an upper end which is constrained to move in a circular arc as the feed fork crank is rotated so that the lower end of the fork moves into and out of the baling chamber along a quasi-elliptical path. The path of the lower end of the feed fork is preferably in a generally axial plane of the arcuate portion of the baling chamber. The upper end of the feed fork may be constrained by a rod having one end pivoted thereto and a second end pivoted to the framework of the baler at a point at the side of the baling chamber remote from the inlet thereof. Said second end of the rod may be slidable in a pivot pin but maintained in its normal operating position by a spring. Thus, in the event of the baler being overloaded with material to be baled so that there is an accumulation of more material at the baling chamber inlet than the feeder can feed into the baling chamber, the feed fork is prevented from executing its normal path and rotation of the crank causes the feed fork to pivot about its lower end so that the constraining rod slides, against the action of the spring, through the pivot pin. In order to prevent the continued overloading of the baler a connection is provided between the constraining rod and the drive for the pick-up means, for rendering this drive inoperative in the event of the above described sliding movement of the rod through the pivot pin. When the accumulation of material has been cleared the drive for the pick-up means may be re-engaged. The constraining rod will automatically resume its normal position due to the action of the spring so that the lower end of the feed fork can again execute its quasi-elliptical path and feed material into the baling chamber.

Thus according to a further aspect of the present invention a pick-up baler comprises an overload trip for rendering the drive for the pick-up means inoperative in the event of the baler being overloaded with material to be baled.

Referring to FIGS. 14 to 19 of the drawings, the pick-up baler shown therein comprises a ram 302 mounted for reciprocation along an arcuate path which includes part of a partly arcuate baling chamber 304 and which, during operation of the baler, is disposed in a generally vertical plane extending at right angles to the direction of movement of the baler. An auger 306 is arranged for concentrating material picked up by a pick-up reel 308 towards a feeder 310 for feeding said material into the baling chamber 304 through an inlet 312 in the front side thereof. The inlet 312 communicates directly only with one end portion of the rear of the pick-up reel 308. The inlet 312 embraces the lowermost portion of the arcuate portion of the baling chamber. A knotter assembly, generally indicated at 314 binds bales formed in the baling chamber. A skeleton framework 301 supports the elements of the baler.

The ram 302 is supported on two rollers 316 and 318, located towards the ends of the lower edge 320 of the side 321 of the ram adjacent that side of the baling chamber 304 which contains the inlet 312, and a side roller 322 on the other side of the ram 302 adjacent its upper edge 324. The rollers 316 and 318 run along a rail 326 and in order to prevent the rollers 316 and 318 from jumping off the rail 326, a fourth roller 328 is provided at the upper edge 330 of the side 321 of the ram. The roller 328 is mounted on a pivoted arm 332 and a spring 334 is arranged to urge the roller 328 upwardly to engage the underside of the top of the baling chamber. The roller 328 is located approximately equi-distant from the rollers 316 and 318 and is adjustably mounted so that the effect of the spring 334 can be varied. A knife 336 is fixed to the leading edge 338 of the side 321 of the ram and is arranged to co-operate with a second knife fixed to the edge 340 of the baling chamber inlet 312 for severing material inside the baling chamber from material outside the baling chamber inlet as the ram moves along its compression stroke. The roller 322, which rotates about an axis which is radial to the arcuate path of the ram, runs along a rail 323 provided on the adjacent side of the baling chamber and is located as near as possible to the leading face of the ram so as to provide a reaction for any side thrust which occurs due to the cutting action of the knives. The rail 323 protects the side of the baling chamber from wear and is replaceable. The leading face of the ram is recessed at 342 to accommodate needles 344 which co-operate with the knotter assembly 314.

All the moving parts of the baler are driven from a common input shaft 346 which is adapted for connection to the power take-off of a tractor.

The ram 302 is driven from the shaft 346 through reduction gears 348, a crank 350 and a connecting rod 352. The connecting rod 352 is coupled to the crank 350 with a self-aligning bearing 354 and to the ram 302 with a universal joint 356, thus to allow for flexing of the baler during operation. The crank 354 is double sided and the knotter assembly 314 and feeder 310 are driven from a sprocket 358 on the crank-shaft 355 at the side of the crank 354 remote from the reduction gears 348. A chain 360 passes over the sprocket 358 and over a sprocket 362 for driving the feeder and a sprocket 364 for driving the knotter.

The auger 306 is driven directly from the input shaft 346 by a belt 366 which passes over a pulley 368 on the input shaft 346, a pulley 370 on the auger 306 and idler pulleys 372 and 374 fixed to the framework of the baler. The idler pulleys 372 and 374 guide the belt 366 through an angle of substantially 90° since the axes about which the auger and input shaft rotate are generally at right-angles to one another. The pick-up reel 308 is driven by a belt 376 which passes over a pulley 378 on the auger and a pulley 380 on the reel 308. The belt 376 is crossed so that the auger 306 and reel 308 rotate in opposite directions.

The feeder comprises a feed fork 382 pivotally carried at 384, intermediate its ends, by a crank 386 which is rotated through bevel gears 388 and a shaft 390 on which the sprocket 362 is mounted. The feed fork 382 has a lower end 392 for engaging material to be baled and an upper end 394 which is pivoted to one end of a constraining rod 396, the other end 398 of which is pivoted to the framework of the baler at a point to the rear of the baler, that is to say, at the side of the baling chamber 304 remote from the inlet 312. When the crank 386 is rotated the upper end 394 of the feed fork 382 is constrained by the rod 396 to move in a circular arc with the result that the lower end 392 of the feed fork 382 moves in a quasi-elliptical path, in a well known manner. The feeder 310 is arranged so that the path of the lower end 392 of the feed fork 382 is disposed in an axial plane of the baling chamber and the end 392 of the feed fork 382 enters the baling chamber through the inlet 312 and leaves the baling chamber 304 through the top thereof, thus to feed into the baling chamber 304 material picked up by the pick-up reel 308 and concentrated towards the feeder 310 by the auger 306.

The baler includes an overload trip for rendering the auger and pick-up reel drive inoperative in the event of the baler being overloaded with material to be baled. Details of the overload trip are illustrated in FIGS. 17 and 18 but, for the sake of clarity of the other parts of the baler, the overload trip is not illustrated in FIGS. 14 and 15.

Figure 17:
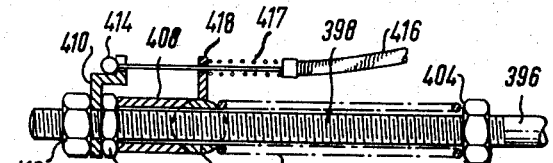
FIGS. 17 and 18 are details of parts of an overload trip which may be incorporated in the baler shown in FIGS. 14 and 15.

Referring to FIG. 17, the end 398 of the constraining rod 396 is slidable in a pivot pin 400 but is maintained in its normal operating position by a compression spring 402 arranged on the rod with one end abutting the pin 400 and the other end abutting a nut 404 received on the rod at a point between the pivot pin 400 and the end of the rod 396 which is pivoted at 394 to the feed fork 382, so as to hold a nut 406 received on the rod at the side of the pivot pin 400 remote from the nut 404 in abutment with a sleeve 408 which is welded to the pin 400 and through which the rod 396 passes. A bracket 410 fixed to the rod between the nut 406 and a nut 412 receives a ball end 414 of the inner core of a Bowden cable 416. A compression spring 417 is arranged between the outer casing of the Bowden cable 416 and a bracket 418 which is welded to the pivot pin 400.

Figure 18:
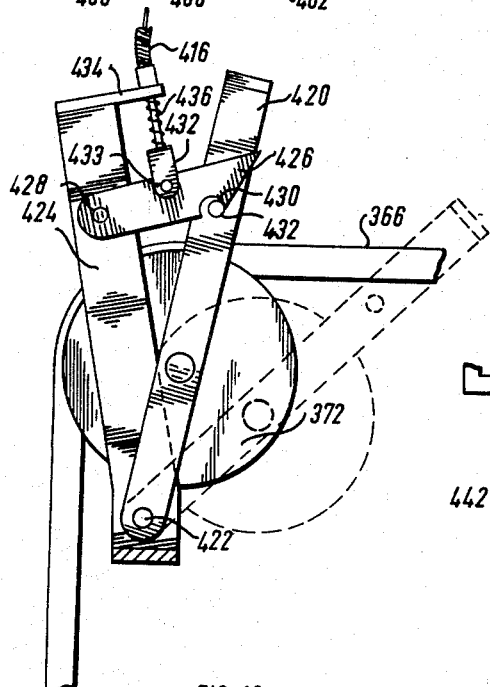

Referring to FIG. 18, the pulley 372, over which the belt 366 for driving the auger 306 passes, is mounted between two support arms 420 (only one of which can be seen) which are pivoted at 422 to a bracket 414 fixed to the framework of the baler. The bracket 424 carries a catch 426 pivoted thereto at 428 and having a notch 430 for engagement by a peg 432 fixed to the support arms 420. The end of the inner core of the Bowden cable 416 is pivotally connected to the catch 426 by a yoke 432 and a pin 433, and the outer casing abuts an extension 434 of the bracket 424. A compression spring 436 is disposed on the inner core of the Bowden cable between the extension 434 and the yoke 432 so that the catch 426 is urged downwardly and the ball end 414 is biased inwardly towards the bracket 418. During normal operation of the baler the peg 432 of the support arms 420 is engaged in the notch 430 of the catch 426, the engagement being maintained by the action of spring 436. In this position of the support arms 420 the pulley 372 maintains the belt 366 taut so that the auger 306 and pick-up reel 308 will be rotated with the input shaft 346. In the event of more material accumulating at the baling chamber inlet 312 than the feeder can feed into the baling chamber 304, the lower end 392 of the feed fork 382 will be unable to execute its normal path. Therefore, rotation of the crank 386 will cause the feed fork 382 to pivot about its end 392 so that the constraining rod 396 slides, against the action of the compression spring 402, through the pivot pin 400 and the feed fork will trail over the top of the accumulation of material. The inner core of the Bowden cable 416 will be pulled, by movement of the bracket 410 with the constraining rod 396, outwardly away from the bracket 418, the coils of the spring 417 closes up to provide a solid abutment for the outer casing, and the catch 426 will be pivoted upwardly to release the peg 432 from the notch 430. The support arms 420 are allowed to pivot downwardly together with the pulley 372, to the position shown in dotted lines in FIG. 18, so that the belt 366 becomes slack and the drive for the auger 306 and pick-up reel 308 is rendered inoperative. When the inlet has been cleared of the accumulation of material the lower end 392 of the feeder fork 382 will again be allowed to execute its normal path and the constraining rod 396 will, under the action of the compression spring 402 again be maintained in its normal operating position. The auger and pick-up reel drive may then be re-engaged by re-setting the catch 426 with the peg 432 engaged in the notch 430. The spring 417 allows for small sliding movements of the rod 396 through the pivot pin 400 during normal operation of the feeder without disengaging the drive of the auger and pick-up reel.

The knotter assembly 314, a star wheel (not shown) for determining the length of bales, and the needles 344 and their co-ordination together can be of any known type, but preferably is that disclosed in U.S. Letters Patent No. 2,909,115 and is driven from the shaft (not shown) on which the sprocket 364 is mounted.

The baling chamber has an extension 438 which is straight and tangential to the arcuate portion. The extension 438 is foldable and comprises side walls and top and bottom walls spring urged towards one another in a well known manner for providing a resistance to the movement of a bale and/or partly formed bale therein during the compression stroke of the ram 302. This part of the baling chamber is not illustrated in detail.

Referring to FIG. 15 of the accompanying drawings, the baler is shown attached to the implement carrying mechanism extending from the rear of a tractor 440. The implement carrying mechanism comprises a pair of hydraulic lift arms 442 (only one of which can be seen) and a control arm 444. The arms 442 and 444 are pivotally received by connections 446 (not shown in detail) of the well known type fixed to the framework 301 of the baler. The common input shaft 346 is connected to the power take-off of the tractor through a Cardan shaft 447 having a universal joint at each end. To prevent the pick-up reel 308 from fouling the ground in the event of the tractor entering a dip or gully skids 450 are provided as part of the framework 301. The input shaft 346 extends to the rear of the baler and the framework of the baler is also provided at its rear with connections 446 so that the baler could be used with a tractor which is provided with an implement carrying mechanism at its front. Alternatively it may be found desirable, when the baler is being carried at the rear of a tractor but is not in use, to attach it to the tractor by the connections 446 which are provided at the rear of the baler so that, since the weight of the baler may be concentrated towards its rear, there will be less tendency for the front wheels of the tractor to be lifted from the ground.

Figure 19:
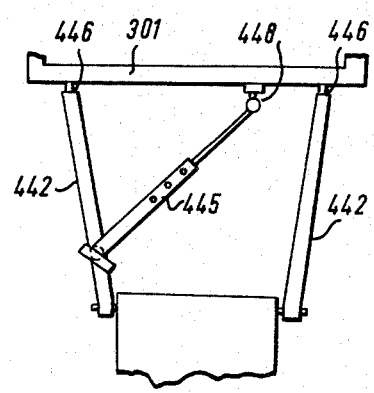
FIG. 19 is a detail showing one method of preventing the baler of the present invention from swinging from side to side when being carried by a tractor.

Referring to FIG. 19, a strut 445 is connected by a ball joint 448 to the framework of the baler at a point between the connections 446 for the hydraulic lift arms, but closer to one than the other. In order to prevent the baler from swinging sideways when being carried by a tractor the end of the strut 445 remote from ball joint is clamped to the hydraulic lift arm 442 which is received by the connection 446 further from the ball joint 448. The strut 445 is detachable and can be attached to the front or the rear of the baler.

A discharge chute may be provided at the discharge end of the baling chamber, as illustrated in FIG. 13.

In the drawings, the extension 438 of the baling chamber is shown inclined upwardly but if desired, the baler could be designed so that the extension 438 is substantially horizontal, and bales are discharged close to the ground.

A ground wheel may be provided at the rear of the baler for supporting part of the weight thereof, for example if the baler is attached to the back of a tractor having a worn hydraulic implement carrying mechanism which is unable to support the entire weight of the baler.

The baler described with reference to FIGS. 14 to 19 has a double sided crank for driving the ram. However, a single sided crank could be employed and the drive for the feeder and knotter assembly could be taken from the crank shaft adjacent the reduction gears, or alternatively directly from one of the reduction gears.

We claim:

1. A pick-up baler comprising a skeleton framework, a pick-up reel mounted on said framework for rotation about an axis transverse to the direction of movement of the baler during operation, means for rotating said pick-up reel about said axis, means disposed substantially immediately above said pick-up reel for urging material picked up by said reel towards one end of said reel, an arcuate baling chamber disposed immediately behind said urging means, said baling chamber extending transversely to the direction of movement of the baler during operation and having an inlet in its front side adjacent said one end of said reel, means for feeding said material through said inlet into said baling chamber, a ram, means for reciprocating said ram along an arcuate path within said baling chamber for compressing material fed into said baling chamber into bales, means for tying bales formed in said baling chamber, and upper and lower connections on the framework of the baler for pivotally receiving at least one control arm and at least one hydraulic lift arm extending from the implement receiving part of a tractor, whereby the baler can be attached to and carried by the tractor as a mounted implement.

2. A pick-up baler according to claim 1 in which said urging means comprises an auger.

3. A pick-up baler according to claim 1 in which said means for feeding material through said inlet comprises a feed fork, means for oscillating said feed fork along a quasi-elliptical path, said quasi-elliptical path being in a plane parallel with the direction of movement of the baler during operation and such that said feed fork when in its forwardmost position is forward of said urging means and when in its rearmost position is within said baling chamber.

4. A pick-up baler according to claim 1 including means for connection to the power take-off of a tractor whereby said reel, said urging means, said feed means, said ram, and said tying means are driven from the power take-off of the tractor.

5. A pick-up baler comprising a skeleton framework, a pick-up reel mounted on said framework for rotation about an axis transverse to the direction of movement of the baler during operation, means for rotating said pick-up reel about said axis, an auger disposed substantially immediately above said pick-up reel for urging material picked up by said reel towards one end of said reel, a transversely extending arcuate baling chamber disposed immediately to the rear of said auger, said baling chamber having an inlet in its front side adjacent said one end of said reel, a feed fork, means for oscillating said feed fork along a quasi-elliptical path, said path being in a plane parallel with the direction of movement of the baler during operation and such that said feed fork when in its forwardmost position is forward of said auger and when in its rearmost position is within said baling chamber, whereby to feed said material through said inlet and into said baling chamber, ram support arm means pivotally mounted on said framework for swinging movement about a generally horizontal axis, a ram on said support arm means oscillatable along an arcuate path including part of said baling chamber, drive means for said ram, means for binding bales formed in said baling chamber, and upper and lower connections on the framework of the baler at the front thereof for pivotally receiving at least one control arm and at least one hydraulic lift arm extending from the rear implement receiving part of a tractor whereby the baler can be attached to the rear of and be disposed entirely behind a tractor and can be carried by the tractor as a mounted implement.

6. In a pick-up baler for use behind a tractor having a rear implement receiving part, a framework, a baling chamber on said framework and having an inlet opening at one side thereof, feed means on said framework for feeding to and through said inlet opening of the baling chamber material to be baled, said feed means including feed forks restrainedly pivotally mounted at one end of a lever for movement along a quasi-elliptical path passing in and out of said inlet opening and lying part within and part without said baling chamber, a pair of links pivotally connected at their one ends to said lever at spaced positions thereon and at their other ends to a third link at spaced positions thereon, the spaced positions on said lever being more widely spaced than said spaced positions on said third link, said third link being pivotally mounted on said framework at its ends remote from said position thereon, and a crank pivotally connected to one of said pair of links intermediate the ends thereof, a ram oscillatable within said baling chamber, drive means for said ram, drive means for said feed means and drive means for said crank, upper and lower connection on said framework adapted to pivotally receive at least one control arm and at least one hydraulic lift arm extending from the rear implement receiving part of the tractor.

7. A pick-up baler according to claim 6 including an overload trip device associated with and forming part of said pair of links.

8. A pick-up baler for use behind a tractor having a rear implement receiving part and a power take-off, a framework, material feeding instrumentalities and bale forming instrumentalities on said framework, said bale forming instrumentalities including an arcuate shaped baling chamber having an inlet opening at one side thereof and a ram oscillatable within the baling chamber and along an arcuate path, said material feeding instrumentalities including feed forks restrainedly pivotally mounted at one end of a lever for movement along a quasi-elliptical path passing in and out of said inlet opening and lying part within the part without said baling chamber a pair of links pivotally connected at their one ends to said lever at spaced positions thereon and at their other ends to a third link at spaced positions thereon, the spaced positions on said lever being more widely spaced than said spaced position on said third link, said third link being pivotally mounted on said framework at its ends remote from said positions thereon, and a crank pivotally connected to one of said pair of links intermediate the ends thereof, drive means on said framework for said instrumentalities, upper and lower connections on said framework adapted to pivotally receive at least one control arm and at least one hydraulic lift arm extending from the rear implement receiving part of the tractor, and power transmission means drivingly coupled to said drive means and adapted to be coupled to the power take-off of the tractor, whereby the baler can be attached to the rear of and be disposed entirely behind the tractor and can be carried by the tractor as a mounted implement and driven thereby.

9. A baler according to claim 8 in which said material feeding instrumentalities include an auger rotatably mounted on said framework for urging material towards said feed forks and said inlet opening.

10. A baler according to claim 9 in which said material feeding instrumentalities include a tined pick-up reel rotatably mounted in said framework.

11. A baler according to claim 9 in which said material feeding instrumentalities include a plurality of forwardly extending fingers pivotally mounted on said framework at a low level and towards the rear thereof and adapted to ride along the ground for gathering material therefrom when the baler is operatively carried along by the tractor.

12. A baler according to claim 9 in which said power transmission means comprises a Cardan shaft and a universal joint at each end thereof.

13. A baler according to claim 9 in which said power transmission means includes a hydraulic power transmission device and hydraulic fluid connections adapted to be connected to the power take-off of the tractor.

14. A baler according to claim 9 including an overload trip device associated with and forming part of said pair of links.

15. A baler according to claim 9 including a discharge chute pivotally mounted on said framework and communicating with the end of the baling chamber remote from said inlet opening, and spring means for normally urging said chute into an upwardly and outwardly inclined position.

16. A baler according to claim 9 including a height control wheel for ground engagement and mounting means for adjustably positioning said wheel at the rear of said framework.

17. A pick-up baler comprising a skeleton framework, a pick-up reel mounted on said framework for rotation about an axis transverse to the direction of movement of the baler during operation, means for rotating said reel about said axis, means disposed substantially immediately above said reel for urging material picked up by said reel towards one end of said reel, an arcuate baling chamber carried by said framework and disposed immediately to the rear of said urging means, said baling chamber extending transversely to the direction of movement of the baler during operation and having an inlet in its front side adjacent said one end of said reel, a feed fork, means for oscillating said feed fork along a quasi-elliptical path lying in a substantially radial plane of said baling chamber, said path being such that said feed fork when in its forwardmost position is forward of said urging means and when in its rearmost position is within said baling chamber whereby to feed material through said inlet into said baling chamber, a ram, rollers on said ram, support means for said rollers with said baling chamber, said ram being supported by said rollers for reciprocating movement along an arcuate path in said baling chamber, drive means for said ram, means for binding bales formed in said baling chamber, and upper and lower connections on said framework for pivotally receiving at least one control arm and at least one hydraulic lift arm extending from the implement receiving part of a tractor whereby the baler can be attached to and carried by the tractor as a mounted implement.

18. A pick-up baler according to claim 17 including rails within said baling chamber, said rollers on said ram being arranged to run along said rails.

19. A pick-up baler according to claim 17 including skids fixed to said framework for maintaining said pick-up reel spaced from the ground during operation of the baler.

20. A pick-up baler according to claim 17 in which said urging means is an auger.

21. A pick-up baler according to claim 18 in which said pick-up reel, said auger, said ram, said feed fork and said binding means are driven from a common input shaft rotatably mounted on said framework and adapted for connection to the power take-off of a tractor.

22. A pick-up baler comprising a skeleton framework, a baling chamber carried by said framework, said baling chamber defined by a pair of opposed plane sides disposed in substantially vertical planes, and a top and a bottom, and having an arcuate portion and a straight portion, said straight portion being inclined upwardly, and said baling chamber having an inlet in one of said plane sides, said inlet embracing the lowermost portion of said arcuate portion of said baling chamber, a ram, means for reciprocating said ram along an arcuate path in said arcuate portion of said baling chamber, means carried by said framework for picking up and feeding through said inlet and into said baling chamber material to be baled, means for binding bales formed in said baling chamber, means adapted for connection to the power take-off of a tractor for driving said ram, said pick-up and feed means, and said binding means, and upper and lower connections on said framework for pivotally receiving at least one control arm and at least one hydraulic lift arm extending from the implement receiving part of a tractor whereby the baler can be attached to and carried by the tractor as a mounted implement.

23. A pick-up baler comprising a skeleton framework a pick-up reel mounted on said framework for rotation about an axis transverse to the direction of movement of the baler during operation, means for rotating said reel about said axis, means disposed substantially immediately above said reel for urging material picked up by said reel towards one end of said reel, a baling chamber carried by said framework and having an arcuate portion and a straight portion, said arcuate portion having an inlet opening communicating with said one end of said reel, means for feeding material picked up by said pick-up and urged towards one end of said reel through said inlet and into said baling chamber, a ram, rollers on said ram, support rails for said rollers in said arcuate portion of said baling chamber, drive means for reciprocating said ram along said support rails whereby to compress said material into bales in said straight portion of said baling chamber, means for binding said bales, and upper and lower connections on said framework for pivotally receiving at least one control arm and at least one hydraulic lift arm extending from the implement receiving part of a tractor whereby the baler can be attached to and carried by the tractor as a mounted implement.

24. A pick-up baler comprising a skeleton framework a pick-up reel mounted on said framework for rotation about an axis transverse to the direction of movement of the baler during operation, means for rotating said reel about said axis, means disposed substantially immediately above said reel for urging material picked up by said reel towards one end of said reel, a baling chamber carried by said framework and disposed immediately to the rear of said urging means, said baling chamber extending transversely to the direction of movement of the baler during operation and having an arcuate portion and a straight portion, said arcuate portion having an inlet opening communicating with said one end of said reel, means for feeding material picked up by said pick-up and urged towards one end of said reel through said inlet and into said baling chamber, a ram, rollers on said ram, support rails for said rollers in said arcuate portion of said baling chamber, drive means for reciprocating said ram along said support rails whereby to compress said material into bales in said straight portion of said baling chamber, means for binding said bales, and upper and lower connections on said framework for pivotally receiving at least one control arm and at least one hydralic lift arm extending from the implement receiving part of a tractor whereby the baler can be attached to and carried by the tractor as a mounted implement.

25. A pick-up baler according to claim 24 in which said straight portion of said baling chamber is inclined upwardly and said inlet embraces the lowermost region of said arcuate portion.

References Cited by the Examiner
UNITED STATES PATENTS

| | | | |
|---|---|---|---|
| 2,625,048 | 1/53 | Vissat | 74—44 |
| 2,652,728 | 9/53 | Kiekhaefer | 74—44 |
| 2,658,323 | 11/53 | Russell | 56—341 |
| 2,820,493 | 1/58 | Davis | 172—439 X |
| 2,843,989 | 7/58 | McClellan | 56—241 X |
| 2,852,903 | 9/58 | Olson el al. | 56—1 X |
| 2,909,887 | 10/59 | Class | 56—341 |
| 2,920,752 | 1/60 | Heinlein | 198—223 |
| 2,929,191 | 3/60 | Lohnert | 56—341 |
| 2,970,423 | 2/61 | Wenzel | 100—189 X |
| 3,022,622 | 2/62 | Nolt | 56—341 |
| 3,035,391 | 5/62 | Dutschmann et al. | 56—341 |
| 3,044,243 | 7/62 | Wenzel | 56—341 |

FOREIGN PATENTS 1,051,222  9/55  France.

T. GRAHAM CRAVER, *Primary Examiner.*

CARL W. ROBINSON, ANTONIO F. GUIDA, RUSSELL R. KINSEY, *Examiners.*

UNITED STATES PATENT OFFICE
CERTIFICATE OF CORRECTION

Patent No. 3,177,641                      April 13, 1965

Walter Noel Powell et al.

It is hereby certified that error appears in the above numbered patent requiring correction and that the said Letters Patent should read as corrected below.

In the heading to the printed specification, lines 9 and 10, for "Claims priority, application Great Britain, Dec. 27, 1962, 48,615/62" read -- Claims priority, application Great Britain, Dec. 28, 1959, 43,957/59; Dec. 27, 1962, 48,615/62 --.

Signed and sealed this 5th day of October 1965.

(SEAL)
Attest:

ERNEST W. SWIDER
Attesting Officer

EDWARD J. BRENNER
Commissioner of Patents